United States Patent
Lentz

(10) Patent No.: US 8,915,763 B1
(45) Date of Patent: Dec. 23, 2014

(54) BEEHIVE FRAME SCRAPING TOOL

(76) Inventor: Wyman C. Lentz, Ladson, SC (US)

( * ) Notice: Subject to any disclaimer, the term of this patent is extended or adjusted under 35 U.S.C. 154(b) by 206 days.

(21) Appl. No.: 13/595,447

(22) Filed: Aug. 27, 2012

(51) Int. Cl.
*A01K 51/00* (2006.01)

(52) U.S. Cl.
USPC .............................................. 449/61; 449/64

(58) Field of Classification Search
USPC ........ 449/61, 64; 7/105, 166, 158; 15/236.01, 15/236.09, 236.06, 236.05, 236.08, 15/236.03; 144/114.1, 115, 124, 126, 144/134.1, 154.5, 146, 147, 162.1, 167, 185
IPC ...................................................... A01K 51/00
See application file for complete search history.

(56) References Cited

U.S. PATENT DOCUMENTS

| | | | | |
|---|---|---|---|---|
| 140,426 | A * | 7/1873 | Monce | 7/105 |
| 1,211,098 | A * | 1/1917 | Darrin | 15/236.05 |
| 2,413,394 | A | 12/1946 | Volgenau et al. | |
| 2,593,304 | A | 4/1952 | Howard | |
| 2,860,858 | A * | 11/1958 | Kurs | 366/129 |
| 3,157,946 | A * | 11/1964 | Smecko | 30/169 |
| 3,523,314 | A | 8/1970 | Homins | |
| 4,481,687 | A | 11/1984 | Arndt | |
| 4,553,279 | A * | 11/1985 | Gassew et al. | 7/105 |
| D286,457 | S * | 10/1986 | Thomas | D32/49 |
| D368,998 | S * | 4/1996 | King | D32/46 |
| 5,694,660 | A * | 12/1997 | Rachwalski | 15/237 |
| D405,668 | S * | 2/1999 | Henke | D8/34 |
| 5,956,788 | A * | 9/1999 | Henke | 7/105 |
| 2007/0124881 | A1 * | 6/2007 | Daugherty | 15/143.1 |

* cited by examiner

*Primary Examiner* — Rob Swiatek
*Assistant Examiner* — Kathleen Alker
(74) *Attorney, Agent, or Firm* — Crossley Patent Law

(57) ABSTRACT

A beehive frame scraping tool that includes a head portion having a first cutaway section disposed upon a first side edge, a second cutaway section disposed upon a second side edge, a top side edge disposed endwise perpendicularly between the first side edge and the second side edge, wherein the first cutaway section includes a rectangular section cut away from the first side edge and the second cutaway section includes a generally triangular section cut away from the second side edge, wherein the first side edge is usable to scrape a frame along at least two perpendicularly adjacent surfaces, the second side edge is useable to clip foundation wire, pry and remove nails from said frame, a point edge is usable to scrape a foundation groove in a frame, and a square edge is usable to scrape a wedge slot of a frame, whereby honeycomb is more expediently harvested.

5 Claims, 7 Drawing Sheets

BEEHIVE FRAME SCRAPING TOOL

TO ALL WHOM IT MAY CONCERN

Be it known that I, Wyman C. Lentz, a citizen of the United States, have invented new and useful improvements in a beehive frame scraping tool as described in this specification.

BACKGROUND OF THE INVENTION

Various types of tools adapted for use with beekeeping are known in the prior art. However, what is needed is a beehive frame scraping tool that includes a head portion having a first cutaway section disposed upon a first side edge, a second cutaway section disposed upon a second side edge, a top side edge disposed endwise perpendicularly between the first side edge and the second side edge, wherein the first cutaway section includes a rectangular section cut away from the first side edge and the second cutaway section includes a generally triangular section cut away from the second side edge, wherein the first side edge is usable to scrape a frame along at least two perpendicularly adjacent surfaces, the second side edge is useable to clip foundation wire, pry and remove nails from said frame, a point edge is usable to scrape a foundation groove in a frame, and a square edge is usable to scrape a wedge slot of a frame, whereby the head portion enables harvesting honeycomb and scraping and maintaining beehive frames without the need of multiple tools.

FIELD OF THE INVENTION

The present invention relates to a beehive frame scraping tool, and more particularly, to a beehive frame scraping tool that includes a head portion having a first cutaway section disposed upon a first side edge, a second cutaway section disposed upon a second side edge, a top side edge disposed endwise perpendicularly between the first side edge and the second side edge, wherein the first cutaway section includes a rectangular section cut away from the first side edge and the second cutaway section includes a generally triangular section cut away from the second side edge, wherein the first side edge is usable to scrape a frame along at least two perpendicularly adjacent surfaces, the second side edge is useable to clip foundation wire, pry and remove nails from said frame, a point edge is usable to scrape a foundation groove in a frame, and a square edge is usable to scrape a wedge slot of a frame, whereby the head portion enables harvesting honeycomb and scraping and maintaining beehive frames without the need of multiple tools.

SUMMARY OF THE INVENTION

The general purpose of the beehive frame scraping tool, described subsequently in greater detail, is to provide a beehive frame scraping tool which has many novel features that result in a beehive frame scraping tool which is not anticipated, rendered obvious, suggested, or even implied by prior art, either alone or in combination thereof.

The present beehive frame scraping tool has been devised to enable beekeepers to expediently harvest, maintain, and clean beehive frames with a single tool. Although the present tool is most adapted to assist in harvesting honeycomb and scraping wax off honey frames, it should be noted that the present beehive frame scraping tool is usable in most beehive frame maintenance, as will become evident throughout the specification.

The present beehive frame scraping tool, then, has been configured to scrape perpendicular surfaces of a beehive frame, scrape the foundation groove in a beehive frame, scrape the wedge slot for the foundation wedge in a beehive frame, as well as pry and remove nails and clip foundation wire disposed upon the frame, as needed. The present beehive frame scraping tool is also usable to cut honeycomb from the frame and pry the foundation wedge of a frame from the wedge slot in the frame.

The present beehive frame scraping tool, therefore, includes a handle portion and a head portion. The handle portion includes a metal heel cap disposed endwise upon the handle portion, which metal heel cap is useful in flattening raised nails against the frame, as desired, to fit a particular frame flush within the hive, and to crimp and hold foundation wire in place.

The head portion of the beehive frame scraping tool is a generally parallelepiped member having a first cutaway section and a second cutaway section disposed on a respective first side edge and a respective second side edge. A top side edge is disposed endwise perpendicularly between the first side edge and the second side edge.

The first cutaway section, disposed in the first side edge, defines a rectangular section cut away from the first side edge. The first side edge therefore includes a first inner edge disposed between a first right angle and a second right angle, a second inner edge disposed between the second right angle and a third right angle, and a third inner edge disposed between the third right angle and a fourth right angle. The first side edge further includes a square edge disposed between the fourth right angle and the top side edge.

The first cutaway section is usable to scrape perpendicularly adjacent surfaces disposed on a beehive frame. When the second inner edge is disposed to contact, and thus scrape, a first surface of said frame, the first inner edge and alternately the third inner edge may be positioned to contact, and thus scrape, a second surface disposed perpendicular to said first surface. Thusly a beekeeper may scrape perpendicular surfaces disposed along a particular section of frame at the same time, and without having to reorient the frame to access said second surface for scraping.

The square edge is configured to transversely fit within a wedge slot disposed on a beehive frame when the foundation wedge has been removed. The present beehive frame scraper tool enables rapid scraping of the wedge slot—the square edge scrapes along the horizontal surface, and a portion of the top side edge and a portion of the third inner edge scrape the opposing perpendicular surfaces on either side of the horizontal surface. One action by the beekeeper scrapes all three surfaces, and the wedge slot is scraped thereby.

The second cutaway section, disposed upon the second side edge, is a generally triangular section cut away from the second side edge proximal to the top side edge. The second cutaway section includes a first indent and a second indent. A point edge is disposed between the second cutaway section and the top side edge, the point edge including a sloped edge.

The first indent is usable to clip foundation wire, as desired, when maintaining a frame and harvesting honeycomb. The second indent is usable to raise and remove nails from the frame. The point edge is configured to fit into the foundation groove of a frame to scrape therein, as desired, when cleaning and maintaining a beehive frame.

The top side edge is configured to assist the harvesting of honeycomb by cutting said honeycomb away from the frame. The top side edge is also usable by a to beekeeper to pry the foundation wedge of a frame out of the wedge slot for maintenance and cleaning.

Thus has been broadly outlined the more important features of the present beehive frame scraping tool so that the detailed description thereof that follows may be better understood and in order that the present contribution to the art may be better appreciated.

Objects of the present beehive frame scraping tool, along with various novel features that characterize the invention are particularly pointed out in the claims forming a part of this disclosure. For better understanding of the beehive frame scraping tool, its operating advantages and specific objects attained by its uses, refer to the accompanying drawings and description.

BRIEF DESCRIPTION OF THE DRAWINGS

Figures

DETAILED DESCRIPTION OF THE DRAWINGS

Figure 1:
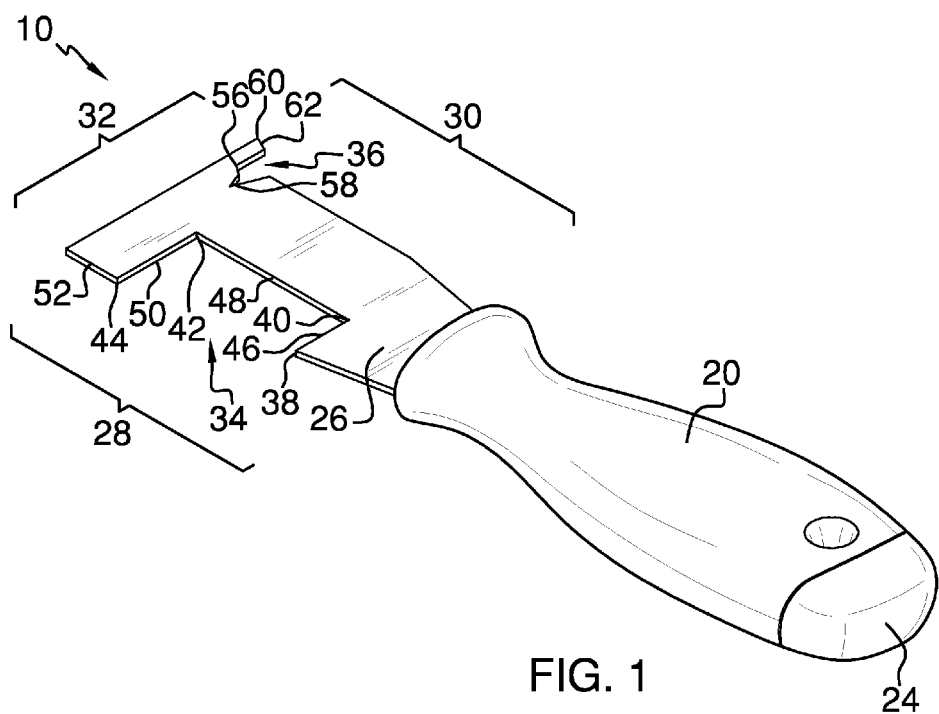
FIG. 1 is an isometric view.
Figure 2:
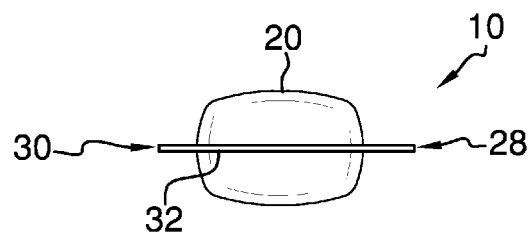
FIG. 2 is a top view.
Figure 3:
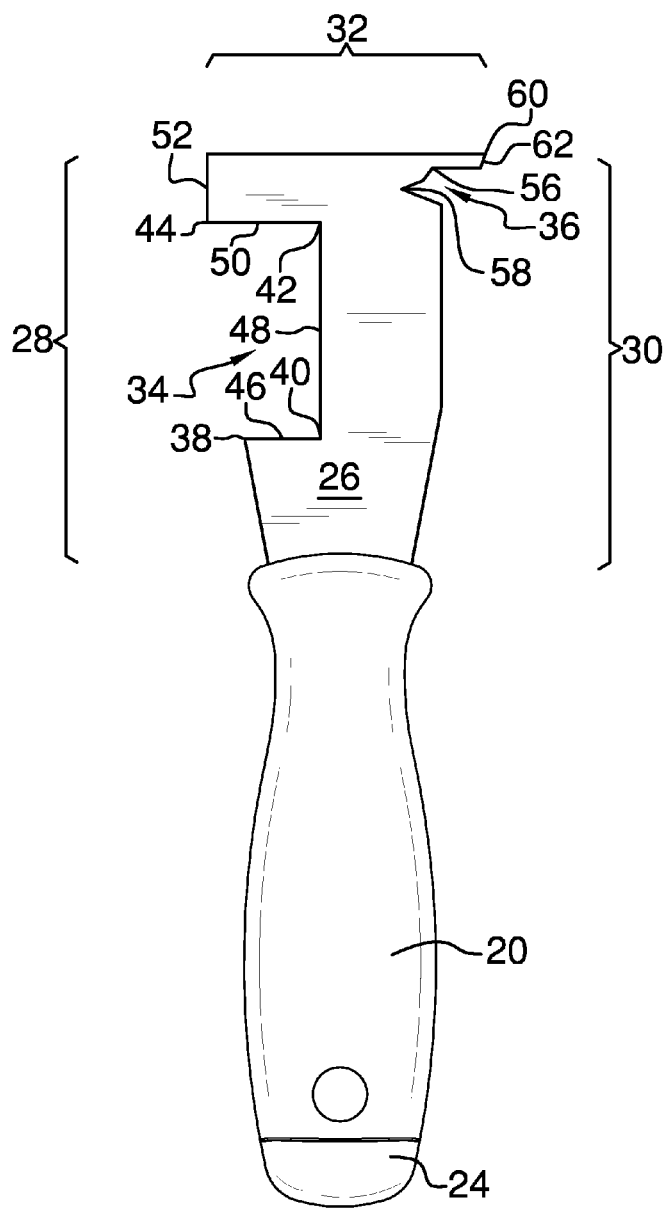
FIG. 3 is a side view.
Figure 4:
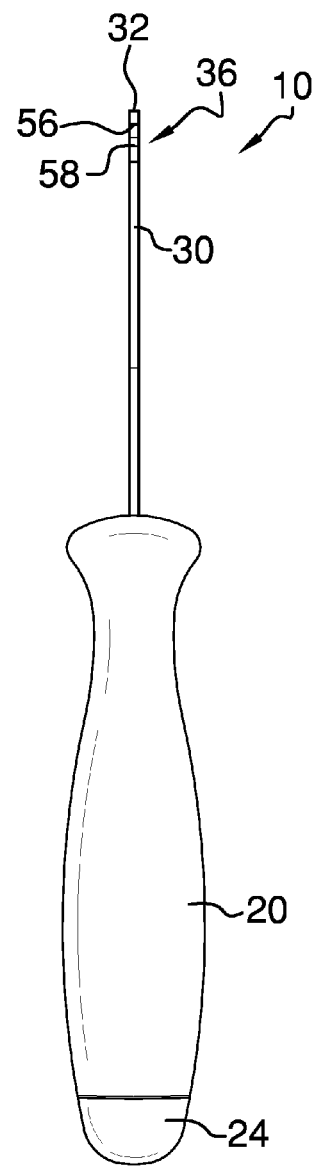
FIG. 4 is an edge view.
Figure 5:
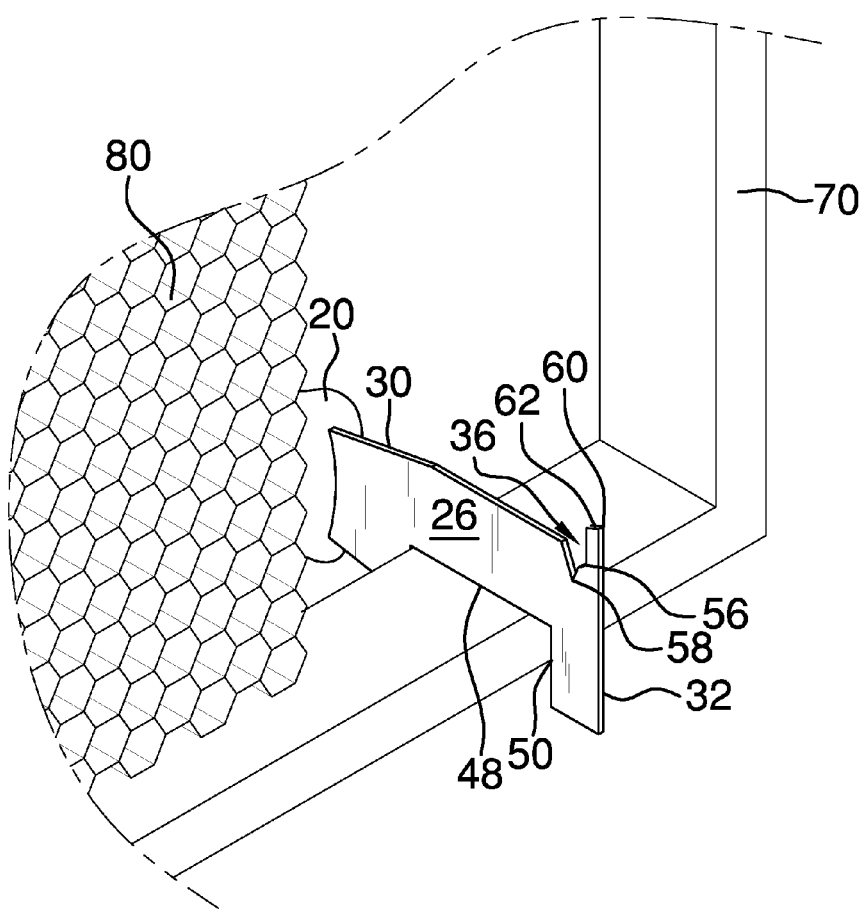
FIG. 5 is an in-use view.
Figure 6:
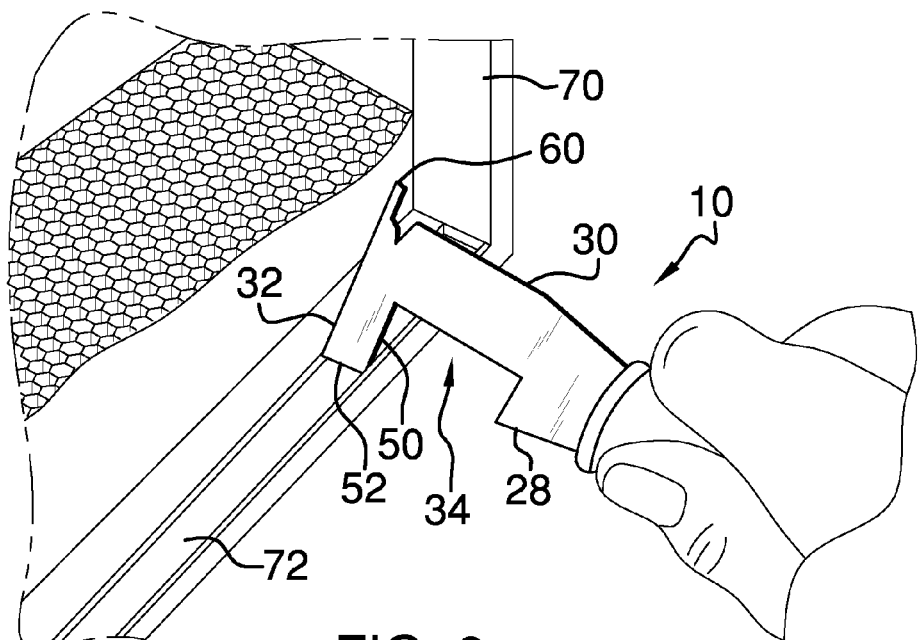
FIG. 6 is an in-use view illustrating a square edge scraping a wedge slot.
Figure 9:
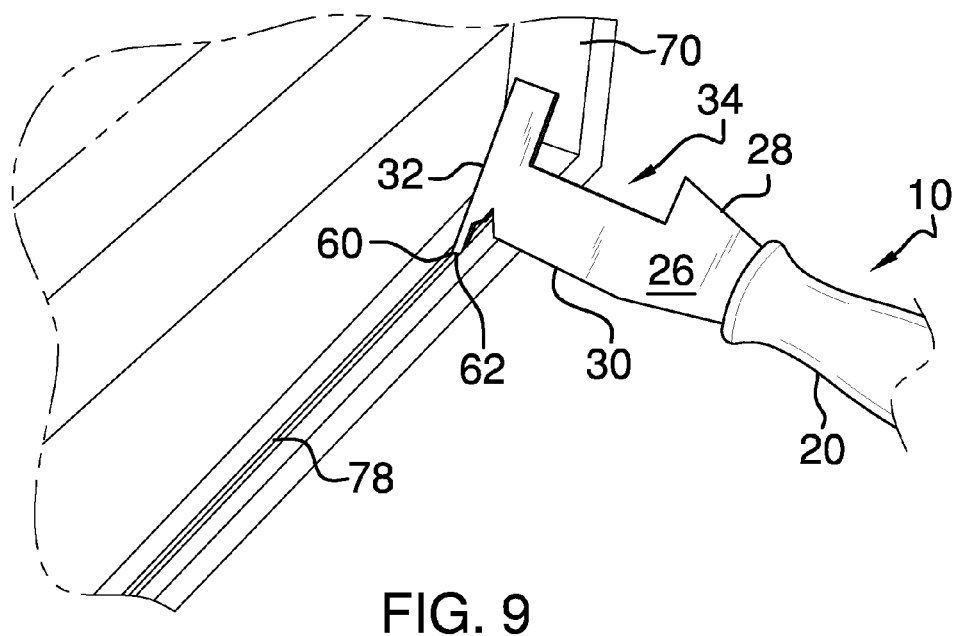
FIG. 9 is an in-use view illustrating a point edge scraping along a foundation groove in a beehive frame.
Figure 7A:
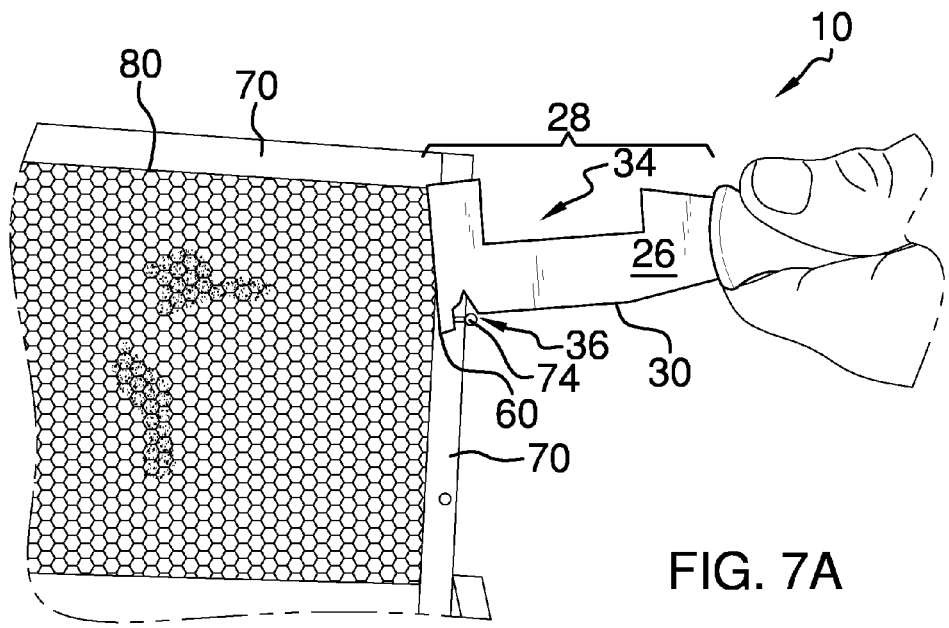
FIG. 7a is an in-use view illustrating a second side edge raising a wire nail from a frame.
Figure 7B:
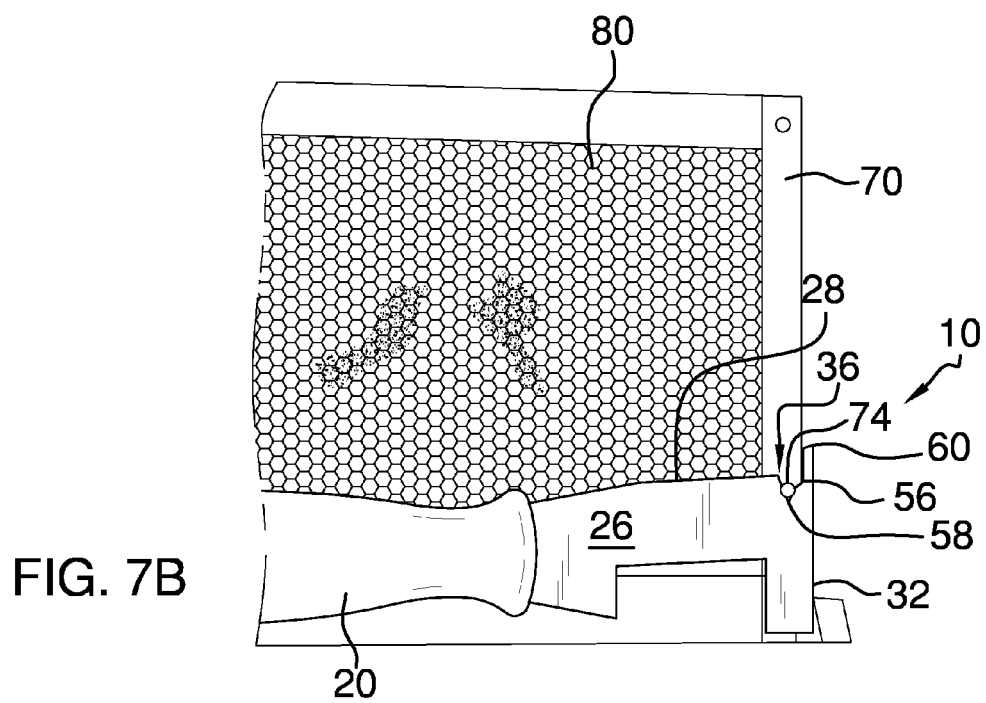
FIG. 7b is an in-use view illustrating the removal of a nail from a beehive frame using a second indent disposed on the second side edge.
Figure 8:
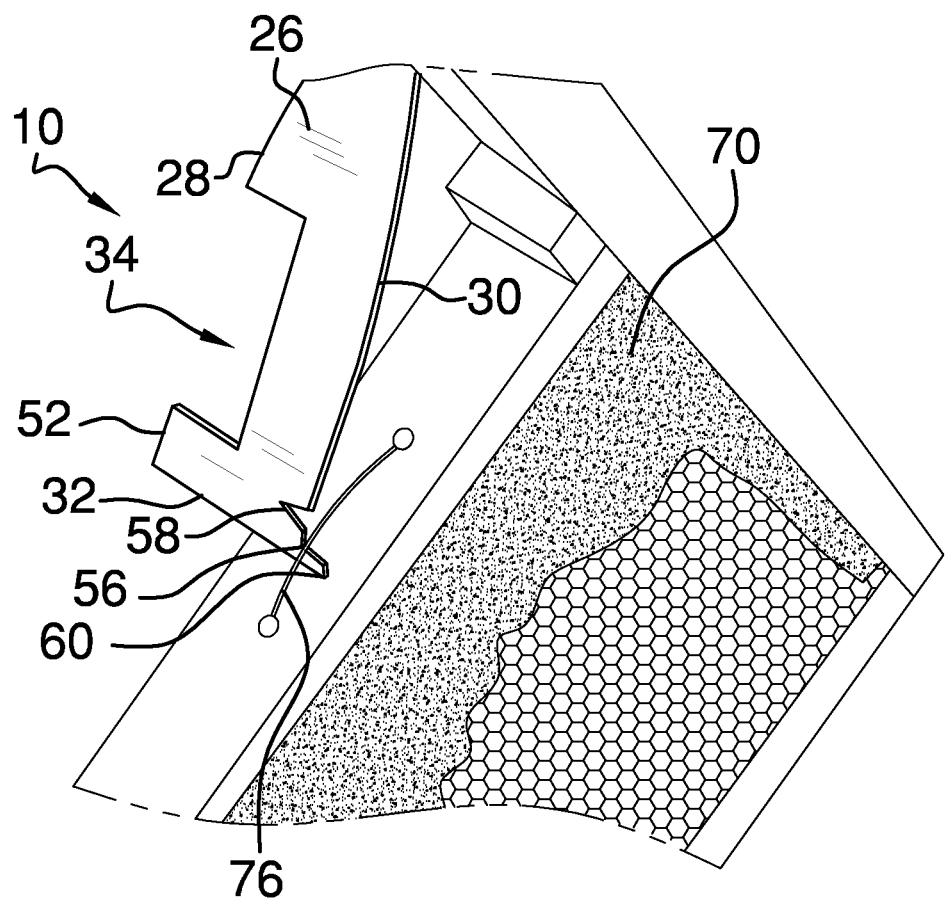
FIG. 8 is an in-use view illustrating clipping foundation wire from a beehive frame by means of a first indent disposed on the second side edge.

With reference now to the drawings, and in particular FIGS. 1 through 10b thereof, example of the instant beehive frame scraping tool employing the principles and concepts of the present beehive frame scraping tool and generally designated by the reference number 10 will be described.

Referring to FIGS. 1 through 10b a preferred embodiment of the present beehive frame scraping tool 10 is illustrated.

The beehive frame scraping tool 10 has been devised for use with the frame 70 of an extant beehive (not shown). The term "frame" as used throughout this specification is intended to include all frames disposed in a beehive. While the device is most useful when harvesting honeycomb from honey super frames, it should be realized that the tool 10 presented herein has multiple uses in beehive maintenance (for example removing nails, straightening and flattening nails, prying wedges, releasing wire, among other uses).

The beehive frame scraping tool 10 includes a handle portion 20 and a head portion 26. A metal heel cap 24 is disposed endwise upon the handle portion 20, said metal heel cap 24 usable to flatten nails against the frame 70 during frame cleaning and maintenance. A head portion 26 with cutaway sections 34, 36 is disposed upon the handle portion 20 (see FIGS. 1 and 3).

The head portion 26 includes a first side edge 28, a second side edge 30 disposed generally parallel with the first side edge 28, and a top side edge 32 disposed generally perpendicularly between the first side edge 28 and the second side edge 30. A first cutaway section 34 is disposed generally centrally upon the first side edge 28, said first cutaway section 34 forming a rectangular indentation upon the first side edge 28. A second cutaway section 36 is disposed upon the second side edge 30, said second cutaway section 36 forming a generally triangular indentation upon the second side edge 30 proximal to the top side edge 32.

The first cutaway section 34 thusly defines a squared perimeter within the first side edge 28. The first side edge 28 therefore includes a first right angle 38, a second right angle 40, a third right angle 42, and a fourth right angle 44. A first inner edge 46 is disposed between the first right angle 38 and the second right angle 40, a second inner edge 48 is disposed between the second right angle 40 and the third right angle 42, and a third inner edge 50 is disposed between the third right angle 42 and the fourth right angle 44. If should be noted from FIGS. 1 and 3 that the third inner edge 50 has a length longer than the first inner edge 46.

The first side edge 28 is therefore usable to scrape along a beehive frame 70 (see FIG. 5) with the second inner edge 48 scraping along a first surface and the first inner edge 46, and alternately the third inner edge 50, scraping along a second surface of the frame 70, said second surface disposed perpendicularly adjacent to the first surface.

The first side edge 28 further includes a square edge 52 disposed on the first side edge 28 proximal the top side edge 32 between the top side edge 32 and the fourth right angle 44. The square edge 52 is configured to fit into a wedge slot 72 disposed upon the frame 70 whereby the wedge slot's perpendicular surfaces are readily scraped by the square edge 52, a portion of the third inner edge 50, and a portion of the top side edge 32 (see FIG. 6).

The second cutaway section 36 is disposed upon the second side edge 30, said second cutaway section 36 forming a generally triangular indentation upon the second side edge 30 proximal to the top side edge 32. The second cutaway section 36 includes a first indent 56 and a second indent 58. The second indent 58 is usable to raise and remove wire nails 74, and nails from the frame, as desired, when harvesting, cleaning, or maintaining a particular beehive frame (see FIGS. 7a and 7b). The first indent 56 is usable to clip foundation wire 76 on the beehive frame 70 (see FIG. 8).

A point edge 60 is disposed on the second side edge 30 proximal to the top side edge 32 and the second cutaway section 36. The point edge 60 is a tapered section of the second side edge 30, disposed between the second cutaway section 36 and the top side edge 32. The point edge 60 includes a sloped edge 62 configured to scrape the foundation grooves 78 of a beehive frame 70 (see FIG. 9).

Figure 10A:
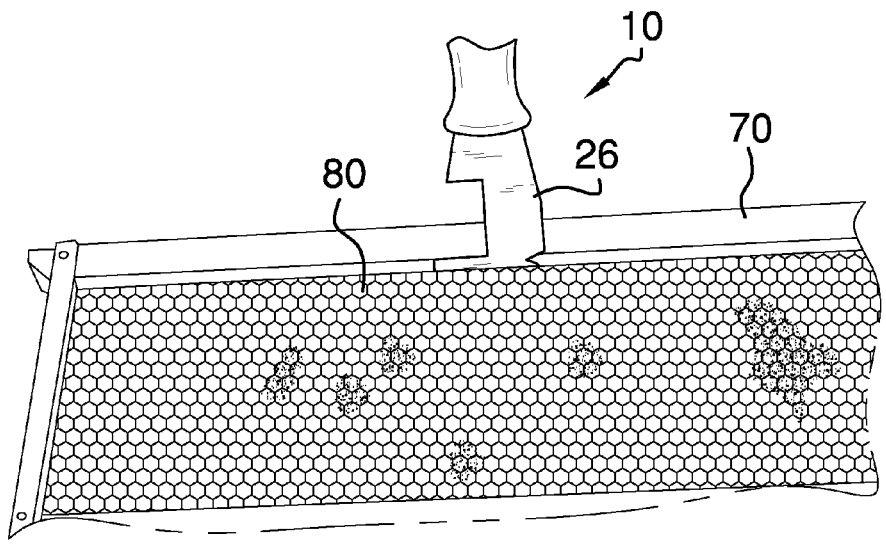
FIG. 10a is an in-use view of a top side edge cutting honey comb from a frame.
Figure 10B:
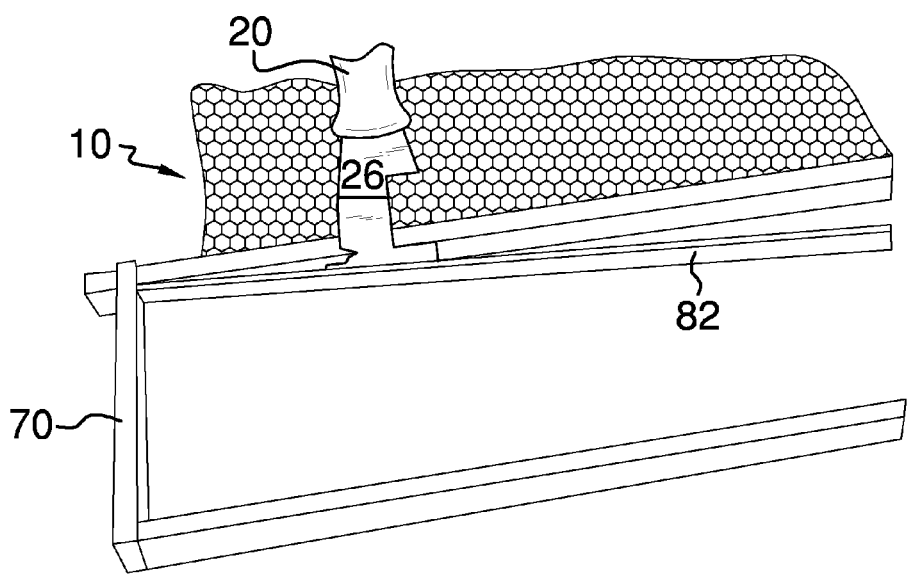
FIG. 10b is an in-use view of the top side edge prying a foundation wedge from a frame.

The top side edge 32 is configured to cut honey comb 80 from the beehive frame 70 during harvesting, maintenance and cleaning, as well as to pry the foundation wedge 82 from said frame 70 (see FIGS. 10a and 10b). The beehive frame scraping tool 10 is configured to assist in expediently harvesting, cleaning, and maintaining beehive frames 70 without having to change tools to get the job done. The present beehive frame scraping tool 10 has been devised as an all-in-one tool for beekeepers harvesting honey and comb and performing routine maintenance and cleaning of a beehive. A beekeeper need only alternate the position and situation of the present beehive frame scraping tool 10 in his hand to effectuate a needed utility in performing beehive harvesting, maintenance, and cleaning.

What is claimed is:

1. A beehive frame scraping tool for use with a frame of an extant beehive, said beehive frame scraping tool comprising:

a handle portion;
a head portion with cutaway sections disposed upon the head portion, said head portion comprising:
   a first side edge;
   a second side edge disposed generally parallel with the first side edge;
   a top side edge disposed endwise generally perpendicularly between the first side edge and the second side edge;
   a first cutaway section of the cutaway sections disposed generally centrally upon the first side edge, said first cutaway section forming a rectangular indentation upon the first side edge, wherein the first cutaway section has a length substantially equal to an aggregate length of each of a remaining portion of the first side edge combined together;
   a second cutaway section of the cutaway sections disposed in the second side edge, said second cutaway section forming a generally triangular indentation upon the second side edge proximal to the top side edge;
   a square edge disposed on the first side edge proximal the top side edge; and
   a point edge disposed on the second side edge proximal to the top side edge and the second cutaway section;
wherein the top side edge is configured to cut honeycomb from the frame of the extant beehive and pry a foundation wedge from the frame, the first cutaway section is configured to scrape each of a flat surface of the frame of said beehive, the point edge is configured to scrape each of a foundation groove of the frame of said beehive, and the second cutaway section is configured to clip foundation wire and remove nails from the frame.

2. The beehive frame scraping tool of claim 1 wherein the handle portion further comprises a metal heel cap disposed endwise upon the handle portion.

3. The beehive frame scraping tool of claim 2 wherein the first cutaway section disposed on the first side edge further comprises:
   a first inner edge disposed perpendicular to the first side edge;
   a second inner edge disposed perpendicular to the first inner edge; and
   a third inner edge disposed endwise upon the second inner edge parallel with the first inner edge, said third inner edge longer than the first inner edge;
   wherein the second inner edge is configured to scrape a first surface of the frame and the first inner edge, and alternately the third inner edge, is thereby configured to simultaneously scrape a second surface disposed perpendicularly adjacent to said first surface, as desired.

4. The beehive frame scraping tool of claim 3 wherein the square edge is configured to fit into a wedge slot disposed upon a beehive frame to expediently scrape wax from out of said wedge slot.

5. A beehive frame scraping tool for use with a frame of an extant beehive, said beehive frame scraping tool comprising:
   a handle portion;
   a metal heel cap disposed endwise upon the handle portion, said metal heel cap configured to flatten nails against the frame during frame cleaning and maintenance;
   a head portion with cutaway sections disposed upon the head portion, said head portion comprising:
      a first side edge;
      a second side edge disposed generally parallel with the first side edge;
      a top side edge disposed endwise generally perpendicularly between the first side edge and the second side edge;
      a first cutaway section disposed generally centrally upon the first side edge, said first cutaway section forming a rectangular indentation upon the first side edge, said first cutaway section comprising:
         a first inner edge disposed between a first right angle and a second right angle, a second inner edge disposed between the second right angle and a third right angle, and a third inner edge disposed between the third right angle and a fourth right angle;
      a second cutaway section disposed in the second side edge, said second cutaway section forming a generally triangular indentation upon the second side edge proximal to the top side edge, said second cutaway section comprising:
         a first indent configured to cut foundation wire disposed upon the beehive frame;
         a second indent configured to raise and remove nails from said frame;
      a square edge disposed on the first side edge proximal the top side edge, said square edge disposed between the top side edge and the fourth right angle; and
      wherein the first cutaway section has a length substantially equal to an aggregate length of the square edge from the third inner edge to the top side edge and the first side edge from the first inner edge to a junction between the head portion and the handle portion combined together;
      a point edge disposed on the second side edge proximal to the top side edge and the triangular cutaway section of the second cutaway section;
   wherein the top side edge is configured to cut honeycomb from the frame of the extant beehive and pry a foundation wedge from said frame, the first cutaway section is configured to scrape each of a flat surface of said frame, the square edge is configured to fit transversely into a wedge slot in said frame, the point edge is configured to scrape each of a foundation groove of said frame, and the triangular cutaway section is usable to clip foundation wire and remove nails from said frame.

* * * * *